United States Patent [19]

Norell et al.

[11] 4,205,719
[45] Jun. 3, 1980

[54] BUILDING MODULE FOR A CEILING

[76] Inventors: Bo Norell, Solvändegatan 4E; Bror Norell, Nordanbygatan 18, both of S-722 23 Västerås, Sweden

[21] Appl. No.: 913,298

[22] Filed: Jun. 7, 1978

[30] Foreign Application Priority Data

Jun. 13, 1977 [SE] Sweden .............................. 7706839

[51] Int. Cl.² ........................... F28F 7/00; F24H 9/08
[52] U.S. Cl. ....................................... 165/76; 165/49; 219/345
[58] Field of Search .................... 165/49, 53, 76; 219/213, 345; 362/147, 148, 149, 150, 218, 226, 365, 404, 408, 409

[56] References Cited

U.S. PATENT DOCUMENTS

| 2,591,168 | 4/1952 | Latham et al. ............... 165/49 |
| 3,143,637 | 8/1964 | Rifenbergh ................ 219/345 |
| 3,260,835 | 7/1966 | Soukey et al. .............. 219/345 |
| 3,277,273 | 10/1966 | Williams .................... 219/345 |
| 3,323,582 | 6/1967 | Armstrong .................. 165/49 |
| 3,603,764 | 9/1971 | Martin ....................... 219/213 |

FOREIGN PATENT DOCUMENTS

| 93872 | 7/1962 | Denmark ..................... 165/49 |
| 589752 | 5/1947 | United Kingdom ........... 219/345 |

Primary Examiner—Samuel Scott
Assistant Examiner—Margaret A. Focarino
Attorney, Agent, or Firm—Frishauf, Holtz, Goodman & Woodward

[57] ABSTRACT

A building module for a ceiling having heating elements incorporated therein. The module has the form of a closed unit which can be individually mounted and removed and which comprises a frame and plates arranged on two opposite sides thereof. Heat-emitting elements are protectively arranged in the space defined by said frame and said plates and element connecting means are accessible from outside the unit and are arranged, when a unit is mounted together with other similar units to permit the elements to be connected to the intended supply source via other units located between the source and said one unit. The unit is so constructed that when mounting the same in position adjacent a similar unit there is formed a downwardly open channel between the units which channel is intended to be closed by means of a separate cover member.

8 Claims, 14 Drawing Figures

BUILDING MODULE FOR A CEILING

The present invention relates generally to ceilings having heating elements incorporated therein, and particularly to a building module for such ceilings.

The heating of rooms by means of heat radiated from the respective ceilings of the rooms has a number of important advantages over conventional heating systems. For example, it has been found that energy can be saved by lowering the temperature of a room since as a result of the heat-radiation from the ceiling, there is a decrease in the amount of heat radiated from the body of a person within the room to the surroundings, which means that the room feels warmer than it actually is. Further advantages are that uniform and comfortable heat is obtained over the whole of the room, and that the need of conventional radiators is eliminated.

Known ceiling heating-systems utilise elements in the form of electrically conductive metal-foil, laminated between plastics films. These ceiling elements are unrolled and firmly fixed to the ceiling and covered with a ceiling board so that they cannot be seen. When attaching the elements directly to the ceiling rafters, the elements must be adapted in size to the rafters of the ceiling and adjusted exactly in relation thereto in a manner such that those portions of the elements which lie against the rafters are not provided with the metal foil. Such adjustment and adaptation is also required when attaching the elements to battens or the like fixed to the ceiling.

Further, the ceiling must be provided with separate means to prevent anybody to tread through the ceiling.

Another disadvantage with known ceiling-heating elements is that they are not able to withstand harsh mechanical handling and are readily damaged during the construction of a building in which they are to be incorporated, since the elements lie completely unprotected until the ceiling is in place. If possible faults in the elements are not discovered until the ceiling has been built, it may be necessary to remove the whole of the ceiling in order to be able to repair or to replace the faulty element. Further, the installation of the heating elements requires the use of a qualified electrician, since each element or group of elements must be connected to a separate junction box located on a wall of the building. The electrical installation of the heating elements has been found to be particularly expensive because of the large number of connection boxes required.

A primary object of the present invention is to provide a flexible ceiling-heating system which can be installed and mounted simply and inexpensively and in which, inter alia, the aforementioned disadvantages are eliminated.

This object is achieved in accordance with the invention by providing a building module for ceilings, the building module having the form of a closed unit which can be mounted in position and removed individually and which comprises a frame having plates arranged on the upper and lower sides thereof with heat-emitting elements arranged in the space defined by said frame and said plates. The elements are connected by means of connecting means accessible from outside the unit and adapted, when mounted together with other similar units, to permit said element to be connected to the supply source via other units located between said source and said unit, said unit being so constructed that when mounted adjacent a similar unit there is formed a downwardly open channel between the units, said channel being arranged to be closed by means of a separate cover member. When the building modules are intended to be mounted directly to the rafters of the ceiling or like structural members, the upper plate of the unit has a thickness such as to eliminate the risk of anybody treading through the ceiling. The under plates of respective unit and said cover member are conveniently given a surface structure which is desirable with respect to the finished ceiling.

When using building modules constructed in accordance with the invention, a completed ceiling having heating elements incorporated therein is obtained directly when placing said modules in position. In addition to heating with electric elements, the invention also permits a flowing heating-fluid to be used.

When electric heating is used, the connection between the various modules suitable is effected by means of conductors provided at the ends thereof with coupling devices adapted to fit the connectors of the modules, said conductors being placed in the channels formed when mounting the modules in position. These connections can be made by the workmen mounting the ceiling elements in position, as requirements do not call for the service of an authorized person herefor, whereafter the said channels are closed with the cover members. The modules can be fitted without it being necessary to adapt them accurately to ceiling rafters or like structural elements, and it is only necessary for one coupling per room-unit to be made by an authorised electrician, which coupling can be carried out subsequent to placing the complete ceiling in position. Thus, the building module according to the invention rationalises both the assembly of the ceiling and the work necessary to connect the heating elements electrically. A further, considerable advantage is that each module can be mounted and removed individually, thereby enabling a faulty module to be readily replaced by a serviceable one.

As previously mentioned, in addition to electrical heating, the building module according to the invention, can as well be used to carry hot water whilst retaining the aforementioned advantages. In this case, hot-water coils or loops are incorporated in the units and are provided with couplings for connecting the same to corresponding pipes of adjacent modules by means of pipes arranged in the channels formed when assembling the modules in position. For the purpose of improving heat transfer from said coil to the bottom plate of individual units, the coils are conveniently embedded in a heat transferring material supported by said bottom plate.

The modules may also be provided with elements for electrical heating and for hot-water heating, the electrical elements, preferably being placed nearest the bottom plate of a respective unit. When water is caused to circulate through the coils with the electrical elements energised, there is obtained a certain degree of heat recovery, since the water absorbs part of the heat which would otherwise be lost from the elements. Modules incorporating water coils may also be used for cooling buildings, in which case cold water is passed through the coils.

In addition to heat-transmitting elements, the units also conveniently incorporate an insulating plate arranged on said element and a heat-radiation reflecting layer arranged on said insulating plate.

So that the invention will be more readily understood and optional features thereof made apparent, exemplary embodiments of the invention will now be described with reference to the accompanying schematic drawings, in which.

Figure 1:
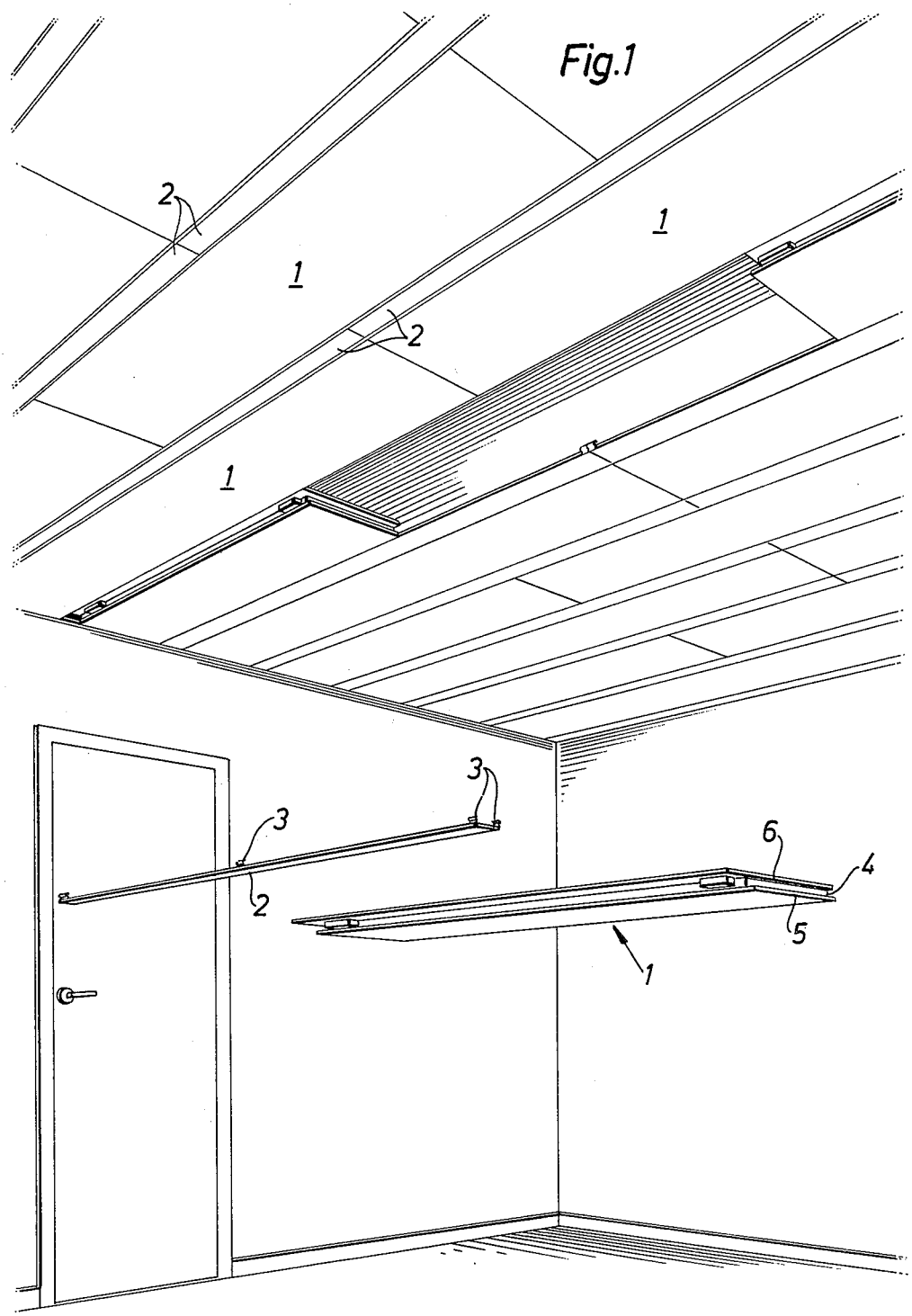
FIG. 1 illustrates a ceiling comprising building modules constructed in accordance with the invention, one of said modules being shown detached from the ceiling by way of illustration.

The ceiling of the room shown in FIG. 1 comprises building modules 1 according to the invention, said building modules being arranged so that when placed in their respective positions they form therebetween an elongate conduit channel closed by means of a respective elongate cover member 2. The cover members 2 are held in position over said conduit channels by snap-action between resilient snap-connectors 3 arranged on the cover members and the edges of mutually adjacent building modules 1. The building modules 1 comprise a rectangular wooden frame 4 having plates 5 and 6 respectively arranged on the top and bottom thereof. The plate 5 and the cover member 2 have a structure desirable in respect of the finished ceiling. The upper plate 6 of the module 1 is suitably so dimensioned that it prevents anybody from treading through the ceiling.

Thus, the building modules 1 according to the invention can be mounted either directly on the rafters of the ceiling, or on some other form of ceiling-structural members, and form directly, when placed in position, a completed ceiling with heating elements incorporated therein. No preparatory battening is required and neither is it necessary to provide auxiliary insulation. The modules can be readily mounted in position, since they are so constructed that the channels required for housing the wiring or pipes are formed automatically when the respective modules are placed in position. It will be noted that the only supply lines which need be placed in the channels are those which connect one module with a preceding and a following module. These connections can be made by the same person putting the modules in position. All other lines are incorporated in the modules themselves and are provided with quick-coupling type connectors which are readily accessible from outside respective modules.

Thus, the building modules are connected to a supply source through other modules located between said source and respective module. When using electrical heating elements in the modules, the whole ceiling can be assembled and the modules connected by one and the same person, whereafter an authorised electrician is able to connect the whole of the ceiling to the mains supply through a single coupling box. When the heating elements in individual modules comprise electrically heated elements, these are preferably connected in parallel to the mains supply. In addition to heating electrically, however, the modules according to the invention are also suitable for heating by means of a flowing fluid or a combination of a flowing medium and electricity. Because the heating elements are fully encapsulated in the modules, they are protected against mechanical damage from the time they leave the factory, i.e. even during the period of construction of the building.

The fact that the modules can be placed in position individually affords the advantage whereby a faulty module can be removed and replaced by a serviceable module without requiring adjacent modules to be demounted. The only requirement in this respect is that the cover member 2 is removed in order that the connections to the module can be disconnected. The faulty module can then be removed from the ceiling structure.

Figure 2:
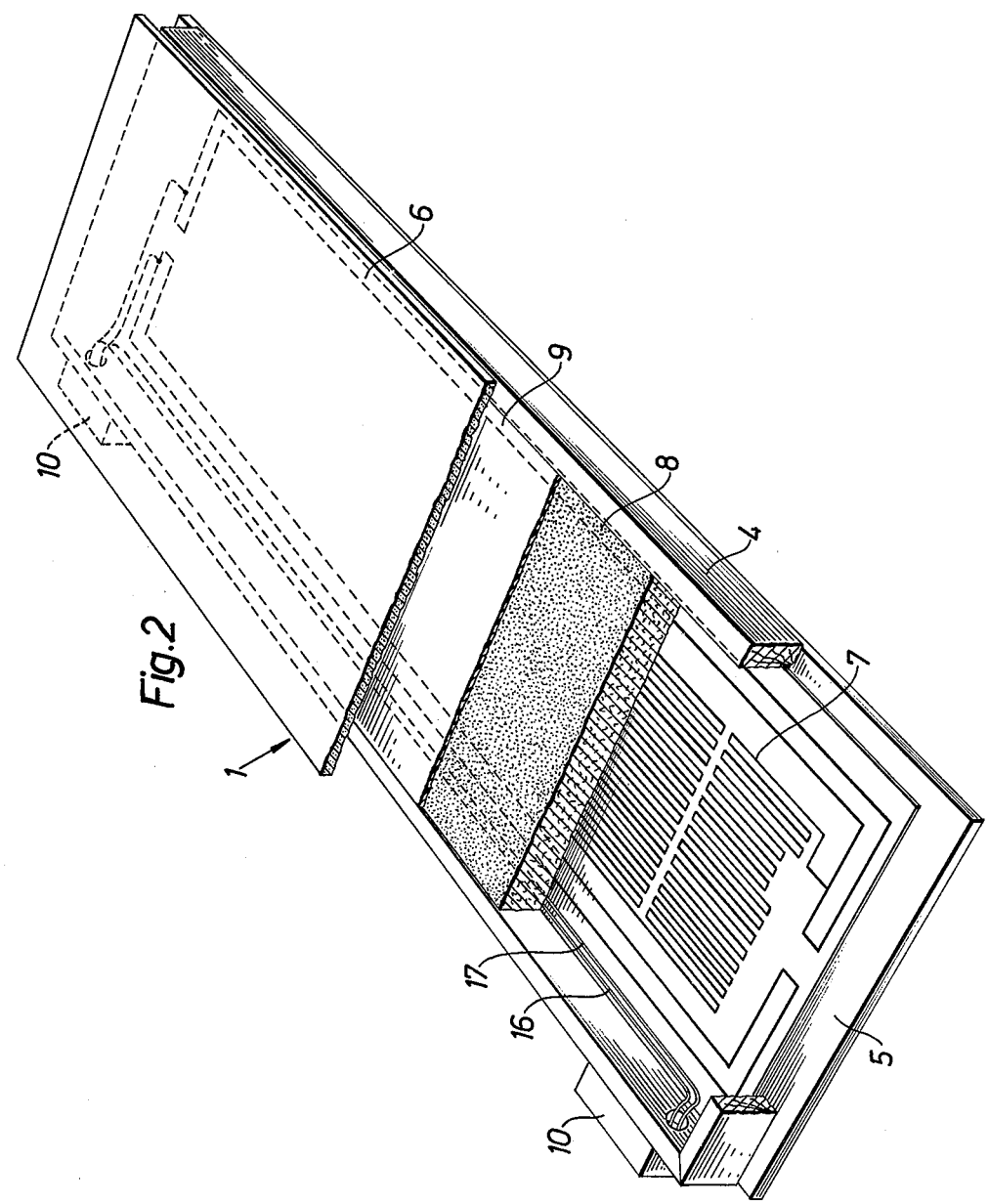
FIG. 2 illustrates one embodiment of a building module according to the invention, partially in section, said module incorporating an electrical heating element.

FIG. 2 illustrates a building module 1 according to the invention intended for electrical heating. In the space formed by the frame 4 and the plates 5 and 6 there is arranged an electrically conductive metal foil 7 which is intended to abut the bottom plate 5 and to serve as heat-emitting means. By means of such a metal foil 7 the heat energy is well distributed without risk of excessive local heating. If, however, part of the element should be heated to a temperature above a given limit value, the conducting path in the foil will be burned out and the current broken. Thus, the foil has a safety mechanism incorporated therein. Arranged on the foil 7 is an insulating plate or sheet 8 of high grade heat-insulating material. Arranged on the upper surface of the plate or sheet 8 is a heat-radiation reflector 9, comprising for example a plastics foil.

Arranged on one of the longitudinally extending sides of the frame 4 are two connecting means 10 which are intended to cooperate with switch means on the connecting lines used to connect the separate building modules one to the other and which are placed in the ducting channels obtained between modules when placing the same in position to build the ceiling. As will be seen from the FIG. 2, the foil element 7 is connected between the two lines 16 and 17 extending between the connecting means 10 and is thus connected to the main supply in parallel with the remaining elements. Each connecting means 10 has the form of a non-interchangeable and protected quick-coupling which locks a plug-type contact means arranged on a connecting line in a contact position by means of a snap-on action.

The upper plate 6 of each building module is constructed in a manner such that it projects outside the frame along at least one longitudinally extending edge thereof. In this way there is obtained, when placing the modules in position, a downwardly open, elongate conduit channel between the building modules. By causing the plates to project outside the frame at the end edges thereof, there is obtained closed passages between the ends of the modules, these channels communicating with the longitudinally extending channels. As previously mentioned, the downwardly open channels are then closed by means of the elongate cover members 2.

Figure 3:
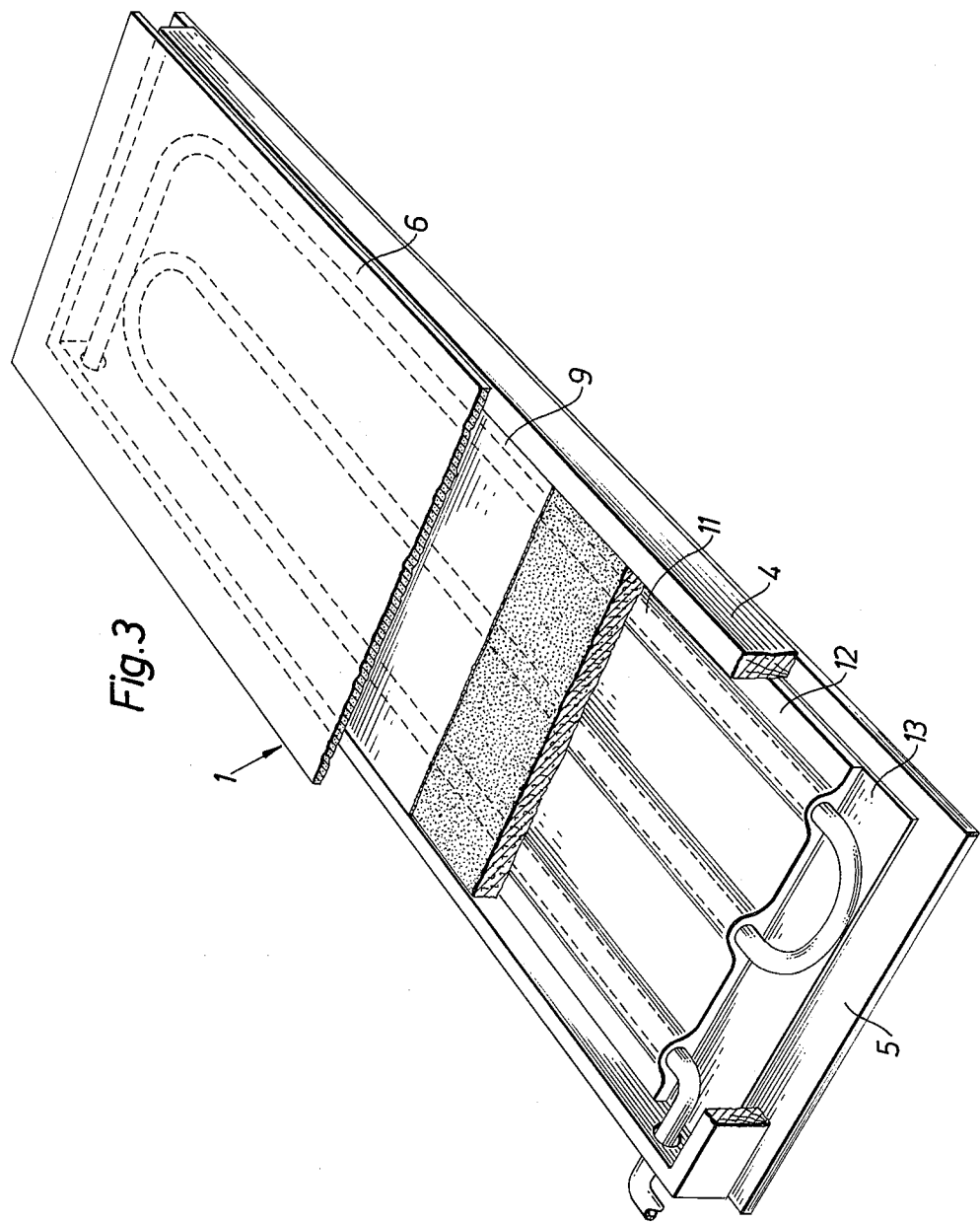
FIG. 3 shows a further embodiment of a building module according to the invention, partially in section, said module incorporating a heating element intended for a heating fluid.

In FIG. 3 there is illustrated a module 1 corresponding to the module illustrated in FIG. 2, although in this embodiment electrically conductive metal foil 7 has been replaced by a conduit or line 11 for a flowing heat-emitting fluid, preferably hot water, said line 11 having the form of a coil or loop. The ends of the line 11 are drawn through the frame 4 and are accessible for connection with the line of a preceding and a following module, by means of suitable couplings and lines placed in the aforementioned channels. For the purpose of improving heat exchange, i.e. heat transfer from the fluid in line 11 to the bottom plate 5 of the building module, the line 11 is drawn in passages in an extruded metal profile 12 having a planar bottom surface intended to be supported by the plate 5 either directly or via an aluminium plate 13 arranged thereon. The body 12 may be replaced by for instance crumpled aluminium foil enclosing line 11.

Figure 4:
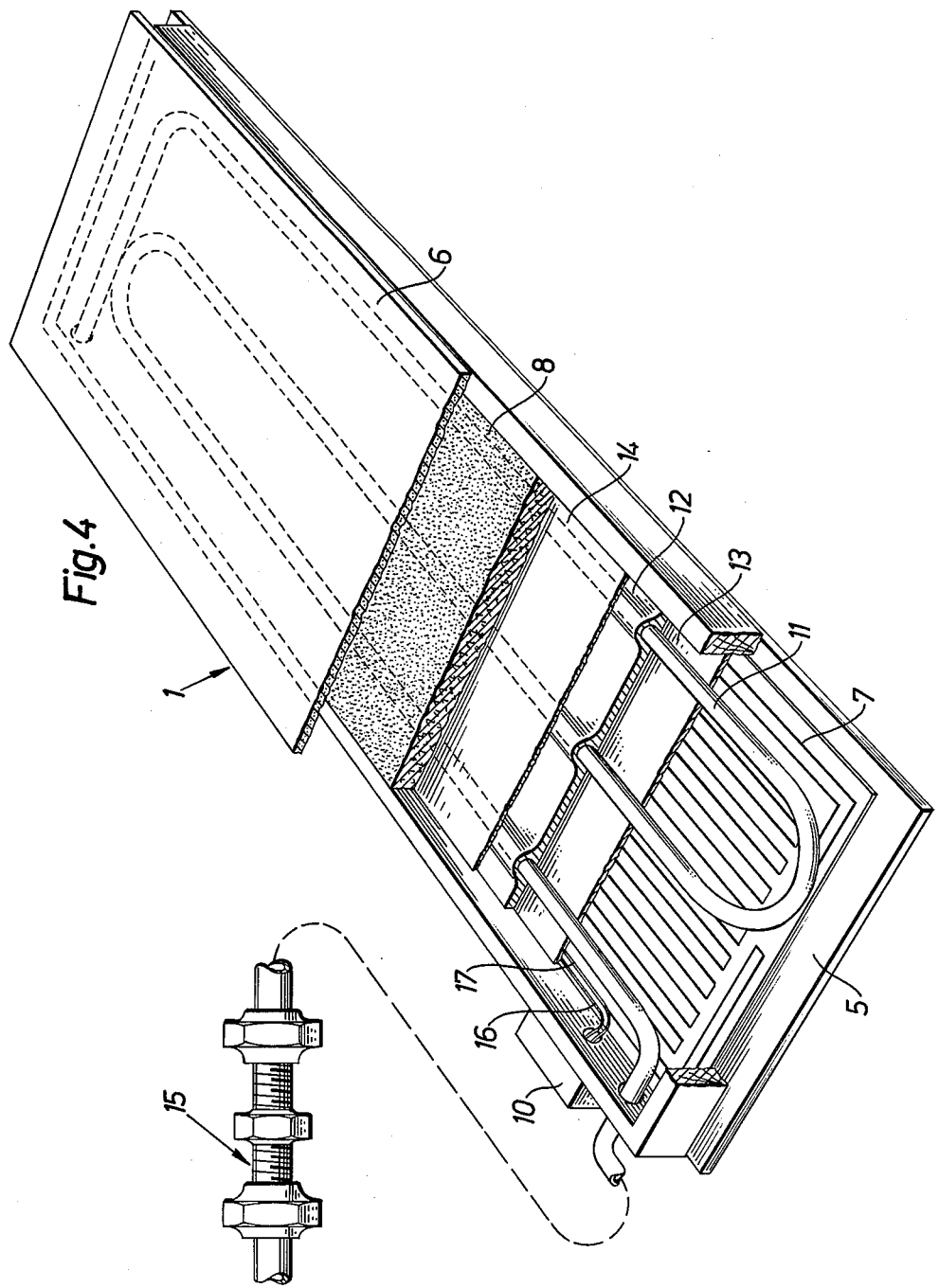
FIG. 4 illustrates another embodiment of a building module according to the invention, partially in section, said module incorporating an electrical heating element and an element intended for a heating fluid.

FIG. 4 illustrates a combined building module 1 intended for both electrical heating and heating by means of a flowing heating fluid. To this end the module is provided with both an electrically conductive metal foil 7 and a profile 12 having a line 11 for conducting a heating fluid. Arranged between these units is an aluminium plate 13. Arranged on the profile 12 is an aluminium foil 14. To the left of the FIG. 4 there is illustrated a known type of coupling 15 which can be used to connect the lines 11 of two mutually adjacent modules.

The building module according to FIG. 4 is primarily intended to be used with water heated by a solar-energy device or the like, thereby enabling the electrical foil element 7 to be energised, e.g. by means of a thermostat, when additional heat is required. This arrangement also permits a certain amount of upwardly radiated heat energy to be recovered from the conductive foil element 7 since this will warm the fluid flowing through the lines 11.

In addition to being used for heating purposes, modules constructed in accordance with FIGS. 3 and 4 may also be used to cool buildings, cold water being circulated through the lines in this case. Energy may also be saved when using any one of the illustrated modules, owing to the fact that the insulation can be accurately adapted to the frames and is applied thereto under factory conditions, which guarantees that no empty spaces are obtained.

The invention can be modified in several respects within the scope of the claims, i.e. with respect to the arrangement of the connecting means. Further, the dimensions of the units comprising the elements and the cover members may be varied as desired and for instance they may be given the same dimensions. A common feature of all the building modules according to the invention, however, is that they have the form of closed individually, mountable and removable units with encapsulated heating elements which lie well protected against mechanical damage and by damage from insects, rodents and the like.

What we claim is:

1. Heated ceiling building module and forming an individual unit adapted for individual attachment to and removal from a building frame structure and for association with similar units, comprising
    a closed frame structure having upright frame elements, a top plate and a bottom plate secured to the frame elements and defining therewith a chamber; the top plate extending beyond the outline of the frame and along at least one side thereof to form, when assembled with another unit adjacent thereto, a downwardly open duct or downwardly open trough;
    a heat emitting element located in said chamber and protected by said frame and plates;
    element connection means accessible from the outside located along a side of the frame over which the top plate extends for connection to a source of energy supply to the heat emitting element in said chamber;
    energy supply means located in said open duct or trough;
    and a removable cover strip secured to the unit and covering said downwardly open duct or trough, spanning to an adjacent unit to form a closed connecting channel for said energy supply means.

2. Module according to claim 1, wherein the top cover plate is of sufficient strength to permit being stepped upon without deflecting so as to essentially impair the volume of said chamber.

3. Module according to claim 1, including an insulating plate or sheet, and a layer of heat radiation reflecting material located on the heat emitting element.

4. A building module according to claim 1, wherein the heat-emitting element comprises an electrically conductive metal foil; the metal foil is connected with the connecting means which, when said unit is mounted together with other similar units, can be used, together with other units located between a supply source and said one unit, to connect the metal foil of said unit and the metal foils of said other units to said source.

5. A building module according to claim 4 provided with two connecting means arranged on said frame and adapted, when the unit is mounted, to be connected with a preceding and a following unit; the two connecting means being mutually connected by means of leads arranged within the unit; and the metal foil being connected between said leads.

6. A building module according to claim 1, wherein the heat-emitting element comprises a looped conduit intended for conducting a heating fluid, said connection means being connected to the two ends of said conduit to render it accessible from outside the unit so as to enable said one unit, when mounted together with other similar units, to be connected to a source of heating fluid together with other units located between the source and said one unit.

7. A building module according to claim 6, wherein the conduit is embedded in a heat radiating material supported by the bottom plate of the unit.

8. A building module according to claim 6, wherein said heat-emitting element further comprises an electrically conductive metal foil, said conduit being arranged above said metal foil; and the connecting means electrically connect said metal foil and connect said conduit in fluid-tight relation, when mounting said unit together with other similar units, to respective supply sources.

* * * * *